United States Patent [19]

Van Roessel

[11] Patent Number: 4,500,922

[45] Date of Patent: Feb. 19, 1985

[54] SYNCHRONOUS DEMODULATION CIRCUIT FOR A CARRIER WHICH IS AMPLITUDE-MODULATED BY A VIDEO SIGNAL

[75] Inventor: Frederik J. Van Roessel, Upper Saddle River, N.J.

[73] Assignee: U.S. Philips Corporation, New York, N.Y.

[21] Appl. No.: 441,698

[22] Filed: Nov. 15, 1982

[30] Foreign Application Priority Data

Dec. 4, 1981 [NL] Netherlands ............ 8105465

[51] Int. Cl.³ ............................................. H04N 5/44
[52] U.S. Cl. ...................... 358/188; 329/50; 329/109
[58] Field of Search .......... 358/21 V, 25, 195.1, 358/188, 21 R; 329/50, 109; 328/164, 155; 455/337; 375/52, 67, 80–83

[56] References Cited

U.S. PATENT DOCUMENTS

| | | | |
|---|---|---|---|
| 3,879,670 | 4/1975 | Fox | 329/50 |
| 3,891,927 | 6/1975 | Filaferro et al. | 375/82 |
| 3,925,608 | 12/1975 | Mollet | 358/162 |
| 3,961,135 | 6/1976 | Ohyama et al. | 358/188 |
| 4,443,769 | 4/1984 | Aschwanden et al. | 329/50 |

Primary Examiner—Michael A. Masinick
Assistant Examiner—Michael D. Parker
Attorney, Agent, or Firm—Thomas A. Briody; William J. Streeter; Charles E. Quarton

[57] ABSTRACT

A demodulation circuit comprising a high-frequency amplifier (2) and a subsequent demodulator (3) the output of which is fedback to a control input of the amplifier (2) via a keyed automatic gain control circuit (5). In addition, the output is fedback to a carrier input of the demodulator (3) via a phase control circuit (11) and a phase shifter (8) to which a reference carrier (CS) is applied. The phase control circuit (11) is supplied with a pulse-shaped signal (VBS) having periodic pulses. The pulses are directly conveyed to the phase shifter (8) and they further switch a gate circuit (19-23) by means of which the demodulator output is connected to an integrating differential amplifier (26) the output of which is coupled to the phase shifter (8). After the demodulation circuit has been activated, an optimum demodulation is always present as the differential amplifier (26) cannot become saturated and a second differential amplifier (37) which has a positive feedback (42) causes a phase control range to be passed through so that no faulty stable states can occur.

9 Claims, 1 Drawing Figure

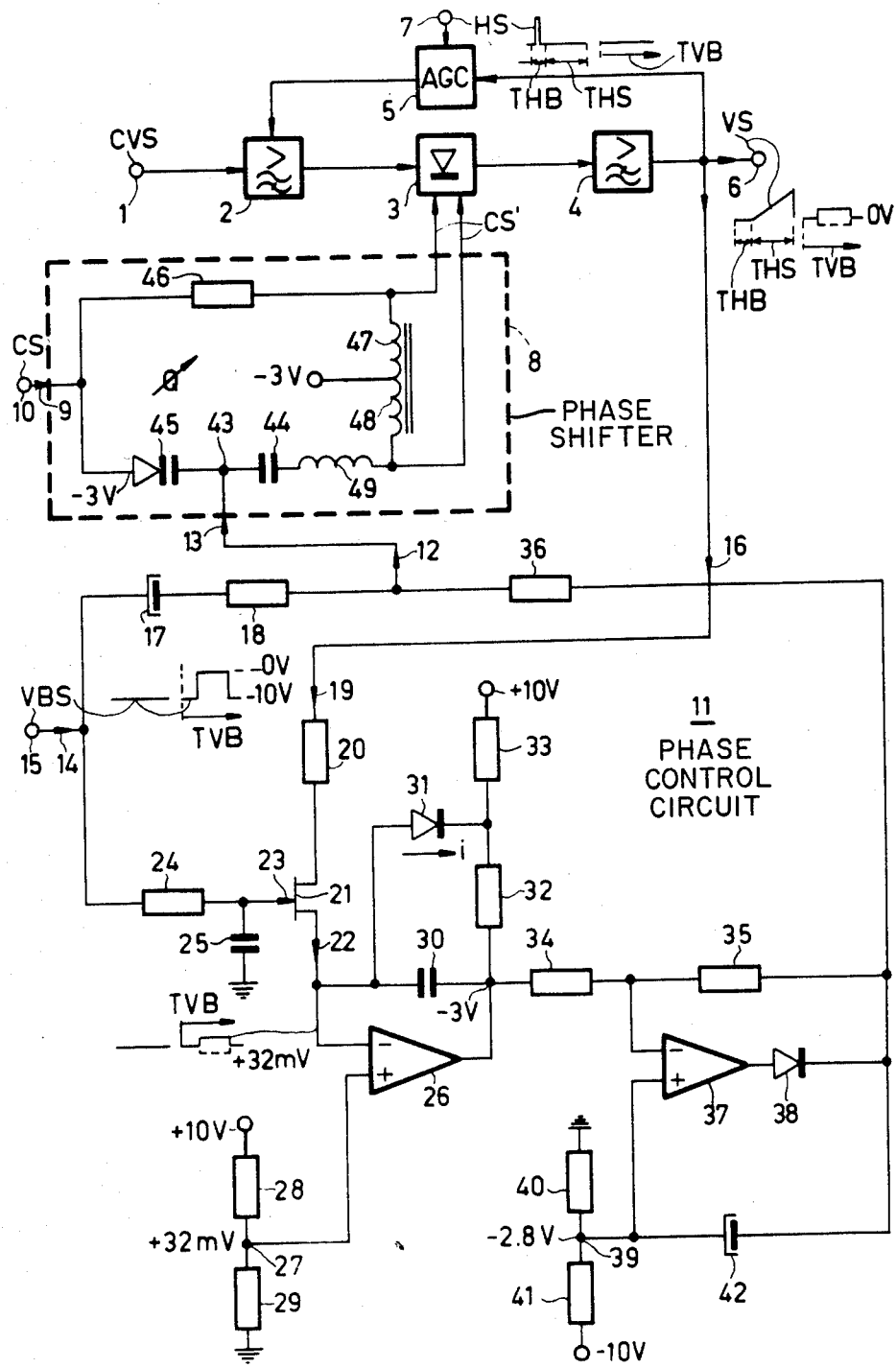

SYNCHRONOUS DEMODULATION CIRCUIT FOR A CARRIER WHICH IS AMPLITUDE-MODULATED BY A VIDEO SIGNAL

BACKGROUND OF THE INVENTION

The invention relates to a synchronous demodulation circuit for a carrier which is amplitude-modulated by a video signal, the circuit comprising a series arrangement of a high-frequency amplifier and a demodulator, an output of the demodulator, for supplying a demodulated video signal containing the d.c. voltage component, being connected to a control input of the high-frequency amplifier via a keyed automatic gain control circuit, the demodulator being connected via a variable phase shifter to a circuit input terminal to which a reference carrier is applied.

Such a synchronous demodulation circuit is disclosed in U.S. Pat. No. 3,925,608. In said patent in the construction of the demodulation circuit, the keyed automatic gain control circuit, which is operative in portions of line blanking periods, results in a demodulated video signal having a constant amplitude and a black level located on a reference potential. All this is of particular importance when the received, modulated carrier signal is supplied by a delay device which is beset with a temperature-dependent signal attenuation and phase variation of the carrier. As a field of application, said patent mentions, by way of example, that what is commonly referred to as vertical aperture correction, the video signal to be corrected being subjected after modulation to delays equal to one and to two line periods, it being a condition that the demodulated video signals must only be delayed and not exhibit distortion.

The patent describes that for optimally performing the synchronous demodulation, the reference carrier is supplied via the phase shifter which is adjustable between plus and minus one carrier period. At optimum synchronous demodulation, the demodulator produces the maximum output signal. The automatic gain control circuit is then operative for keeping the amplitude of the demodulation circuit output signal constant. If the demodulation at the demodulator is not optimum, the automatic gain control circuit will cause, for the period of time it is operative within its control range, the demodulation circuit to supply the output signal with the constant amplitude. The automatic gain control circuit is then operative to correct the non-optimum demodulation. If, however, the automatic gain control circuit reaches the upper limit of the control range with the maximum control, then, when the upper limit is exceeded, the amplitude of the output signal can no longer be kept constant and the black level is no longer at the reference potential, which is impermissible.

It has been found that in practice there are delay devices in which the phase of the modulated carrier varies to a great extent in response to temperature variations. When the synchronous demodulation circuit is put into operation and an optimum demodulation is present, this demodulation may vary to such an extent due to the temperature-dependent phase variation at the received modulated carrier that the automatic gain control circuit is adjusted to beyond its control range. Furthermore, it may be possible that when the circuit is put into operation, there was already no optimum demodulation causing the automatic gain control to go beyond its control range already at smaller temperature variations at the delay device. It is alternatively possible that when the demodulation circuit is put into operation, the automatic gain control circuit cannot come into its control range owing to an excessive phase error in the demodulation.

SUMMARY OF THE INVENTION

The invention has for its object to provide a synchronous demodulation circuit in which, each time after it has been put into operation, there results an optimum demodulation to the best possible extent, controlled automatically. According to the invention, an embodiment of a synchronous demodulation circuit is characterized in that the demodulation circuit further comprises a phase control circuit, having an output connected to a control input of the phase shifter, a first input for receiving a pulse-shaped signal with a pulse in video blanking periods and a second input coupled to the demodulator output for supplying the demodulated video signal, the first input for receiving the pulse-shaped signal, being coupled to the output of said phase control circuit which is further coupled to an output of an integrating fed-back differential amplifier incorporated in said phase control circuit, a (+) input of this differential amplifier being connected to a terminal carrying a reference voltage and a (−) input being connected to a signal output of a gate circuit, this gate circuit having a switching input coupled to the first input for receiving said pulse-shaped signal and a signal input coupled to the second input for receiving the demodulated video signal, the gate circuit being conductive during the said pulses.

The invention is based on the recognition of the fact that optimum demodulation can be obtained by giving the phase shifter, periodically, a small phase shift during video blanking periods. To that end the pulses are applied to the phase shifter. In the absence of a substantially optimum demodulation, this small phase shift results in a change in the pulse voltage level in the demodulated video signal, which level is reduced by means of the phase control circuit until a reference voltage level is reached which is associated with the optimum demodulation. The automatic gain control circuit is now operative for its actual task, namely the elimination of amplitude variations in the input signal, and not for correcting the non-optimum demodulation.

In practice it has been found that an adequate pulse insertion is present in a demodulation circuit which is characterized in that the pulse-shaped signal has a pulse in field blanking periods with a pulse duration of the order of magnitude of between one and several line period. In this situation the phase shifter and the phase of the reference carrier are readjusted once every field period.

A demodulation circuit in accordance with the invention, which, if necessary, responds faster to phase variations is obtained if it is characterized in that the pulse-shaped signal has a pulse in line blanking periods with a pulse duration which is outside the duration of a pulse for the keyed automatic gain control circuit. It is then ensured that the phase control and the gain control can be effected independently from each other in the line blanking periods.

In order to prevent the differential amplifier from applying an unwanted voltage value to the phase shifter on activating the demodulation circuit, a demodulation circuit in accordance with the invention is characterized in that at the integrating, fed-back differential amplifier, a capacitor being provided between the amplifier output and its (−) input thereof, there being provided in parallel with the capacitor, a series arrangement of a biased diode and a resistor, the junction between the diode and the resistor being connected to a voltage-carrying terminal via a further resistor.

The biased diode then ensures that the differential amplifier output voltage cannot exceed a predetermined value.

On activating the demodulation circuit, it may happen that there is applied to the phase shifter a control voltage having such a value and polarity that the phase of the demodulated video signal is reversed and the black level therein is not at the reference potential. An embodiment of the demodulation circuit in which a measure is applied to counteract this, is characterized in that the phase control circuit incorporates a second differential amplifier, a (+) input of which is connected to a terminal carrying a reference voltage and a (−) input is coupled to the output of the first-mentioned differential amplifier via a resistor, the output of the second differential amplifier being connected to the (−) input thereof via a series-arrangement of a diode and a resistor, the junction between the diode and the resistor being connected to the output of the phase control circuit via a further resistor.

The second differential amplifier causes the direction of the change in the control voltage at the control input of the phase shifter to be inverted, so that the phase shifter controls the phase of the reference carrier in the opposite direction. The demodulation circuit may then come to a stable state, which is outside the control range of the automatic gain control circuit, the amplitude and the black level of the demodulated, video signal not having the proper value, while during the conductive state of the gate circuit the reference voltage value associated with optimum demodulation is indeed present. An embodiment of a demodulation circuit with a measure counteracting this is characterized in that the last-mentioned diode is coupled via a capacitor to the (+) input of the second differential amplifier to which the said reference voltage is applied via an ohmic voltage divider.

The positive feedback thus obtained results in the demodulation circuit incorporating the second differential amplifier becoming unstable after it has been put into operation. The phase shifter then passes through its phase range until the automatic gain control circuit is again in its control range within which the second differential amplifier is switched-off and the first differential amplifier becomes operative for obtaining the optimum demodulation.

In order to obtain in this unstable state, an oscillation which is neither too fast nor too slow, a demodulation circuit in accordance with the invention is characterized in that the time constant of the said capacitor and the ohmic voltage divider is of the order of magnitude of the period of the pulses in the said pulse-shaped signal.

In order to obtain a simple coupling between the first input of the phase control circuit and the output thereof, a demodulation circuit in accordance with the invention is characterized in that the first input of the phase control circuit is connected to the output of the phase control circuit via a series arrangement of a capacitor and a resistor, the time constant of the capacitor and resistor being of the order of magnitude of some tens of times the periods of the pulses in the said pulse-shaped signal.

An embodiment of a demodulation circuit in accordance with the invention which exhibits no disturbing cross-talk from the first input to the second input thereof and, consequently, to the demodulated video signal, is characterized in that the first input of the phase control circuit is connected via a resistor to the switching input of the gate circuit which is further connected to ground via a capacitor.

DESCRIPTION OF THE DRAWING

Embodiments of the invention will now be described, by way of example, with reference to the accompanying drawing, the sole FIGURE of which shows an embodiment of a demodulation circuit in accordance with the invention.

DESCRIPTION OF THE PREFERRED EMBODIMENTS

In the FIGURE, reference numeral 1 denotes an input terminal of the demodulation circuit to which a carrier CVS, which is amplitude-modulated by a video signal, is applied. The carrier has, for example, a frequency of 27 MHz. A series arrangement of a high-frequency amplifier 2, a demodulator 3 and a low-frequency amplifier 4 is connected to the terminal 1. An output of the amplifier 4 is connected to an input of a keyed automatic gain control circuit 5(AGC), an output of which is connected to the control input of the high-frequency amplifier 2. The output of the amplifier 4 is further connected to an output terminal 6 of the demodulation circuit for supplying a demodulated video signal VS which contains the d.c. component. By way of example, a signal variation of the signal VS versus the time is shown in the FIGURE at the terminal 6. THB denotes a line blanking period and THS a line scanning period, it holding for a line period TH that: TH=THS+THB. Also the beginning of a field blanking period TVB is shown. The ground potential in the signal VS is indicated by 0V. In the signal VS the ground potential is present during the line blanking periods THB, and, during the line scanning periods THS, the signal VS can have a predetermined amplitude, the ground potential and the amplitude both being obtained by means of the gain control circuit 5. To this end, a control input of the gain control circuit 5 is connected to an input terminal 7 of the demodulation circuit to which a keying signal HS, which is shown next to it, is applied. The keying signal HS has keying pulses during the line blanking periods THB, in the example give, outside the field blanking periods TVB. Demodulator 3 is a balanced demodulator to which a phase-variable reference carrier CS' is applied between two carrier inputs thereof. The carrier CS' is supplied by a phase shifter 8, an input 9 of which is connected to a circuit input terminal 10 to which a reference carrier CS, having the frequency of 27 MHz is applied.

U.S. Pat. No. 3,925,608 mentioned in the foregoing, describes the operation of the demodulation circuit comprising the amplifiers 2 and 4, the demodulator 3, the gain control circuit 5 and the phase shifter 8 which is then an adjustable phase shifter. The low frequency amplifier 4 may be omitted if the series arrangement of the high-frequency amplifier 2 and the demodulator 3 supplies the demodulated video signal, which contains the d.c. voltage component, with a sufficiently large amplitude. It is only important that the obtained demodulated video signal VS has the ground potential as the reference voltage in the line blanking periods THB, and has the described peak-peak value as the amplitude in the line scanning periods THS, all this under the control of the keyed automatic gain control circuit 5.

In accordance with the invention the demodulation circuit incorporates a phase control circuit 11 having an output 12 which is connected to a control input 13 of the phase shifter 8. The phase control circuit 11 has a first input 14, which is connected to a demodulation circuit input terminal 15 to which a pulse-shaped signal VBS, shown next to it, is aplied. During the field blanking periods TVB, the shown signal VBS has a pulse from −10 V to 0 V. The pulse in the signal VBS has, for example, a pulse duration of the order of magnitude of between one and several line periods. The pulse duration, may, for example be between approximately 50μs and approximately 400μs. Instead of occurring during the pulse-shaped signal in the video field blanking period TVB, the pulse may alternatively occur during the video line blanking periods THB, with a pulse-direction outside the pulse duration of the keying pulse in the signal HS for the keyed automatic gain control circuit 7. In this way it is ensured that the gain control and the phase control can be performed independent of each other in the line blanking periods THB. The pulse duration of the pulse in the signal HS may have, for example, a duration of some μs, 2 μs being mentioned as an example.

In addition to the first input 14, the phase control circuit 11 has a second input 16, which is connected to the output of the low-frequency amplifier 4. In the absence of the amplifier, 4, which is in the form of a d.c. voltage amplifier, the input 16 may be connected directly to the output of the demodulator 3.

In the phase control circuit 11, the input 14 is coupled to the output 12 via a series arrangement of an electrolytic capacitor 17 and a resistor 18. The capacitor 17 serves to block any direct current and the resistor 18 has such a high value that the pulse in the signal VBS occurs undistorted and only attenuated at the output 12. From values of the capacitor 17 and the resistor 18 still to be given hereinafter, it will be apparent that the time constant of capacitor 17 and the resistor 18 is of the order of magnitude of some tens of times the period of the pulses in the pulse-shaped signal VBS (the field period).

In the phase control circuit 11, the input 16 is connected to a signal input 19 of a gate circuit (19-23) which incorporates a resistor 20 arranged in series with a field effect transistor 21. The drain of the transistor 21 is connected to a signal output 22 of the gate circuit (19-23) and the gate electrode forms a switcing input 23 of the gate circuit (19-23). The input 14 of the phase control circuit 11 is connected via a resistor 24 to the switching input 23 of the gate circuit (19-23), which is further connected to ground via a capacitor 25. The transistor 21 and, consequently, the gate circuit (19-23) are in the conducting state when the pulse having the ground potential is present in the signal VBS. The resistor 24 and the capacitor 25 serve to prevent the occurrence of disturbing cross-talk from the input 14 carrying the pulse-shaped signal VBS to the input 16 and, consequently, to the output terminal 6 at which the demodulated video signal VS is present.

In the phase control circuit 11 the signal output 22 of the gate circuit (19-23) is connected to the (−) input of a differential amplifier 26. The (+) input of the differential amplifier 26 is connected to a terminal 27, which carries a reference voltage of, for example, +32 mV.

The terminal 27 is a connection point in an ohmic voltage divider (27-29) comprising two series resistors 28 and 29 arranged between supply terminals carrying voltages of +10 V and ground. The supply voltage is obtained from a voltage source, not shown, a terminal of which is connected to ground and another terminal of which may carry a negative voltage.

The output of the differential amplifier 26 is fed back to the (−) input thereof via a capacitor 30. A series-arrangement of a diode 31 and a resistor 32 is provided in parallel with the capacitor 30, the junction point of the diode 31 (the cathode) and the resistor 32 being connected via a resistor 33 to a terminal which carries the +10 V supply voltage. The output of the differential amplifier 26 is coupled to the output 12 via three series-arranged resistors 34, 35 and 36.

For the operation of the integrating fed-back differential amplifier 26, it holds that at output voltage values which are less negative than −3 V or are positive, the diode 31 is cutoff. At an output voltage equal to −3 V, the diode 31, which is biased via the resistors 32 and 33, is made conductive by a current i. Hereinafter it will become apparent that as a result thereof, no voltage value which is undesirable for the phase shifter 8 can occur at the output 12 of the phase control circuit 11.

In addition to the differential amplifier 26, the phase control circuit 11 incorporates a second differential amplifier 37. A (−) input of the differential amplifier 37 is connected to the junction between the resistors 34 and 35 and the amplifier output is connected to the anode of a diode 38, the cathode of which is connected to the junction between the resistors 35 and 36. A (+) input of the differential amplifier 37 is connected to a terminal 39 which carries a reference voltage of, for example, −2.8 V. The terminal 39 is a connection point in an ohmic voltage divide (39-41) which comprises two series resistors 40 and 41 provided between ground and a supply terminal carrying a voltage of −10 V. The choice of −2.8 V for the reference voltage is dictated by the −3 V choice for the voltage at which the diode 31 becomes conducting. Prior to the instant at which the diode 31 can become conductive, the differential amplifier 37 becomes conductive and operates as a voltage inverter, since, for voltage values at the (−) input of the differential amplifier 37 which are less negative than −2.8 V or are positive, the amplifier output carries a negative voltage whereby the diode 38 is cutoff, whereas at a value of −2.8 V for the input voltage at the (−) input the output voltage becomes positive and makes the diode 38 conductive.

In accordance with a further feature of the invention, a positive feedback is provided at the differential amplifier 37 by connecting the cathode of the diode 38 to the (+) input of the differential amplifier 37 via an electrolytic capacitor 42. The capacitor 42 causes, after diode 38 has become conductive, the demodulation circuit to become unstable with a time constant which is equal to the product of the parallel resistance of the resistors 40 and 41 and the capacitance of the capacitor 42. In order to obtain an oscillation which is neither too fast nor too slow, it has been found to be advantageous in practice to choose this time constant of the order of magnitude of the period of the pulses in the pulse-shaped signal VBS (the field period in the example given).

To explain the operation of the phase control circuit 11, the construction of the variable phase shifter 8 is important, hence this construction will be described first. The control input 13 of the phase shifter 8 is connected to a junction 43 between a capacitor 44 and a (voltage-dependent) capacitor 45 having a voltage-dependent capacitance (varicap). The voltage-dependent capacitor 45 is shown as a diode-capacitor, the anode of which is connected to the input 9. The input 9 is further connected via a resistor 46 to a terminal of a first transformer winding 47 and to one of the reference carrier inputs of the demodulator 3. A further terminal of the winding 47 is connected to a terminal which carries a −3 V supply voltage and to which there is further connected a second transformer winding 48. A further terminal of the winding 48 is coupled to the junction 43 via an inductance 49 and the capacitor 44 and is further connected to the other reference carrier input of the demodulator 3. At the voltage-dependent capacitor 45, it is shown that the anode-lead carries the voltage of −3 V (via the resistor 46). The supply of a control voltage of −3 V to the control input 13 and to the junction 43 results in that the voltage-dependent capacitor 45 does not carry a voltage and has a maximum capacitance. The supply of a voltage which is less negative than −3 V and of a positive voltage results in a reduction in the capacitance. By way of example, a maximum capacitance of 35 pF when a control voltage of −3 V is supplied and a minimum capacitance of 9 pF when a control voltage of +8.5 V is applied, are mentioned. The supply of a control voltage which is more negative than −3 V is not permitted as then the voltage-dependent capacitor 45 would not be operative as such (the diode of the diode-capacitor is then conductive). At the control voltage variation mentioned, the phase shifter 8 shifts the phase of the reference carrier CS applied to it through, for example, approximately 270°.

It has been found that depending on the choice of the voltage-dependent capacitor 45, the control voltage to be applied to the control input 13 must not exceed a predetermined lower limit. In the example given, −3 V is mentioned as the lower limit and associated therewith is the choice of −3 V for making the diode 31 conductive and of −2.8 V for making the diode 38 conductive. In the example given, the voltage of −3 V is required by way of bias voltage for the demodulator 3.

To explain the operation of the demodulation circuit, the following three distinct cases will be described. All three cases are based on the assumption that initially the diodes 31 and 38 are non-conducting.

For the first case, it is assumed that when the demodulation circuit is put into operation, the output signal of the demodulator 3 having the proper polarity is of a sufficient strength to enable the keyed automatic gain control circuit 5 to perform its task, that is to say the demodulated signal must be within the control range of the control circuit 5. In that situation the ground potential of OV is ultimately present in the line blanking periods THB and the video signal VS has the prescribed amplitude in the line scanning periods THS. If no optimum demodulation is effected at the demodulator 3, that is to say the phase of the reference carrier CS' is shifted relative to the reference phase, the small phase shift introduced in the phase shifter 8 by the pulse in the signal VBS, will result in a positively or negatively directed pulse being present in the video signal VS in the field blanking period TVB. The positive or negative pulse voltage is passed on to the integrating differential amplifier 26 via the gate circuit (19–23). The pulse voltage deviating from +32 mV, results in such a change in the value of the output voltage of the differential amplifier 26 and consequently also in the control voltage at the control input 13 of the phase shifter 8, that the pulse voltage in the signal VS decreases, in the field blanking period TVB. This voltage decrease continues until the pulse voltage in the signal VS reaches the value of +32 mV, which is then also present at the (−) input of the differential amplifier 26. The output of the differential amplifier 26 then carries an output voltage of between −3 V and +8.5 V. The value of +32 mV in the signal VS corresponds to the optimum demodulation at the demodulator 3. The phase control circuit 11 maintains the optimum demodulation, irrespective of phase variations at the modulated carrier signal CVS.

For the second case, let it be assumed that on putting the demodulation circuit into operation, the output signal of the demodulator 3 is of an insufficient strength to have the keyed automatic gain control circuit 5 perform its function, that is to say the demodulated signal is outside the control range of the control circuit 5. In this situation let it be assumed that the phase difference between the reference value and the received, modulated signal has such a polarity that in the video signal VS, in the field blanking period TVB, a positive pulse voltage occurs. This corresponds to a high voltage of, for example, 8.5 V at the control input 13. Via the gate circuit (19–23) and the integrating differential amplifier 26, the positive pulse voltage results in a less positive amplifier output signal as a result of which, via the lead to the control input 13, the phase of the phase shifter 8 is shifted such that the pulse voltage in the video signal VS decreases. The continuing phase shift results in the amplitude of the video signal increasing sufficiently to come within the control range of the keyed automatic gain control circuit 5. Hereafter the control takes place as described for the first case.

For the third case, let it also be assumed that on putting the demodulation circuit into operation the output signal of the demodulator 3 is not sufficiently strong, so that the keyed automatic gain control circuit 5 cannot perform its function. The polarity of the phase difference between the reference value and the received modulated signal is then such that in the video signal VS, in the field blanking peiod TVB, a positive pulse voltage does indeed occur but the pulse voltage is then, however, less positive than the voltage in the line scanning periods THS. This corresponds to a low voltage of, for example, −1 V at the control input 13. Via the gate circuit (19–23) and the integrating differential amplifier 26, the positive pulse voltage results in a more negative amplifier output voltage. If the diode 31 and the resistors 32 and 33 were absent, this would result in the phase shifter 8 being brought out of adjustment when the −3 V voltage value would be exceeded in the negative sense, as the voltage-dependent capacitor 45 would be made inoperative. The control circuit, incorporating the phase control circuit 11, the phase shifter 8 and the demodulator 3, is then interrupted. The differential amplifier 26 would then be driven to the maximum negative voltage to be produced; after having been put into operation the demodulation circuit is saturated. This saturation corresponds to a faulty stable state.

The use of the diode 31 and the resistors 32 and 33 prevents the saturation of the differential amplifier 26. A direct current path (i) is formed via the diode 31 at the −3 V amplifier output voltage, as a result of which the differential amplifier 26 is not saturated. In addition, at the −2.8 V amplifier output voltage, the differential amplifier 37 is activated, in response to which the control input 13 receives a control voltage which increases from −2.8 V through OV to a positive value. The phase shifter 8 then passes through a portion of its control range, in the opposite direction. As a result thereof the demodulation circuit can reach a stable state. In this stable state the pulse voltage in the signal VS, in the field blanking period TVB, has indeed the +32 mV reference value, although there is no optimum demodulation, while moreover the keyed automatic gain control circuit 5 is outside its control range.

In order to prevent the (faulty) stable state from occurring outside the control range of the gain control circuit 5, the capacitor 42 is arranged in the positive feedback path of the differential amplifier 37. The capacitor 42 produces an instability with an oscillation causing the phase shifter 8 to pass through its phase control range until the automatic gain control circuit 5 does arrive in its control range, within which on the one hand the diode 31 is cut-off and the differential amplifier 26 is activated and on the other hand the diode 38 is cut-off and the differential amplifier 37 is blocked. Thereafter, an adjustment is affected until the optimum demodulation is reached in the manner as described for the first case.

Summarizing all this, it follows for the third case that when the demodulation circuit is put into operation, while the output signal of the demodulator 3 is of an insufficient strength, the diode 31 prevents the differential amplifier 26 from saturating, the differential amplifier 37 and the diode 38 cause the phase shifter 8 to pass through its control range in the opposite direction, and the capacitor 42 prevents a faulty stable state from occurring, it ultimately being made possible for the automatic gain control circuit 5 to perform its function and to readjust the phase control circuit 11 always to the optimum demodulation.

In addition to the data already mentioned in the foregoing a demodulation circuit may in practice incorporate the following components:

capacitors 17 and 42: 1μF
resistor 18: 560 kΩ
resistor 20: 1 kΩ
resistor 24: 1,2 MΩ
capacitor 25: 220 pF
resistor 28: 6,8 MΩ
resistor 29: 22 kΩ
capacitor 30: 150 nF
resistor 32: 13 kΩ
resistor 33: 33 kΩ
resistor 34: 10 kΩ
resistor 35: 56 kΩ
resistor 36: 100 kΩ
resistor 40: 27 kΩ
resistor 41: 68 kΩ
capacitor 44: 582 pF
resistor 46: 220Ω
inductance 49: 2,2 μH For some time constants it follows that:
capacitor 17 and resistor 18: 560 ms
capacitor 42 and resistor 40 and 41: 19.3 ms.

As mentioned already, the first time constant is of the order of magnitude of some tens of time the period of the pulses in the pulse-shaped signal VBS, which is equal to, for example, 20 ms. The second time constant is of the order of magnitude of the said period.

What is claimed is:

1. A synchronous demodulation circuit for a carrier which is amplitude-modulated by a video signal, the circuit comprising a series arrangement of a high-frequency amplifier and a demodulator, an output of the demodulator, for supplying a demodulated video signal containing a d.c. voltage component, being connected to a control input of the high-frequency amplifier via a keyed automatic gain control circuit, the demodulator being connected via a variable phase shifter to a circuit input terminal to which a reference carrier is applied, characterized in that the demodulation circuit further comprises a phase control circuit, having an output connected to a control input of said phase shifter, a first input for receiving a pulse-shaped signal with a pulse in video blanking periods, and a second input coupled to the demodulator output for supplying the demodulated video signal, the first input, for receiving the pulse-shaped signal, being directly coupled to the output of the phase control circuit which output is further coupled to an output of an integrating fed-back differential amplifier incorporated in the phase control circuit, a (+) input of this differential amplifier being connected to a terminal carrying a reference voltage and a (−) input being connected to a signal output of a gate circuit, this gate circuit having a switching input coupled to the first input for receiving the said pulse-shaped signal and a signal input coupled to the second input for receiving the demodulated video signal, the gate circuit being conductive during the occurrence of said pulses.

2. A synchronous demodulation as claimed in claim 1, characterized in that the pulse-shaped signal has a pulse in field blanking periods with a pulse duration of the order of magnitude of between one and several line periods.

3. A synchronous demodulation circuit as claimed in claim 1, characterized in that the pulse-shaped signal has a pulse in line blanking periods, with a pulse duration which is outside the duration of a keying pulse for the keyed automatic gain control circuit.

4. A synchronous demodulation circuit as claimed in claim 1, characterized in that at the integrating, fedback differential amplifier, a capacitor is provided between the amplifier output and the (−) input thereof, and, in parallel with the capacitor, there is provided a series arrangement of a biased diode and a resistor, the junction between the diode and the resistor being connected to a voltage-carrying terminal via a further resistor.

5. A synchronous demodulation circuit as claimed in claim 1, characterized in that the phase control circuit incorporates a second differential amplifier, a (+) input of which is connected to a terminal carrying a reference voltage and a (−) input is coupled to the output of said first-mentioned differential amplifier via a resistor, the output of the second differential amplifier being coupled to the (−) input thereof via a series arrangement of a diode and a resistor, the junction between the diode and the resistor being connected to the output of the phase control circuit via a further resistor.

6. A synchronous demodulation circuit as claimed in claim 5, characterized in that the last-mentioned diode is coupled via a capacitor to the (+) input of the second differential amplifier to which the reference voltage is applied via an ohmic voltage divider.

7. A synchronous circuit as claimed in claim 6, characterized in that the time constant of the said capacitor and the ohmic voltage divider is of the order of magnitude of the period of the pulses in the said pulse-shaped signal.

8. A synchronous demodulation circuit as claimed in claim 1, characterized in that the first input of the phase control circuit is connected to the output of the phase control circuit via a series arrangement of a capacitor and a resistor, the time constant of the capacitor and the resistor being of the order of magnitude of some tens of time the period of the pulses in the said pulse-shaped signal.

9. A synchronous demodulation circuit as claimed in claim 1, characterized in that the first input of the phase control circuit is connected to the switching input of said gate circuit via a resistor which switching input is further connected to ground via a capacitor.

* * * * *